Aug. 17, 1926.  
F. A. KENNEY  
1,596,190  
SYSTEM OF AUTOMOBILE LIGHTING AND LENSES THEREFOR  
Filed Sept. 2, 1924
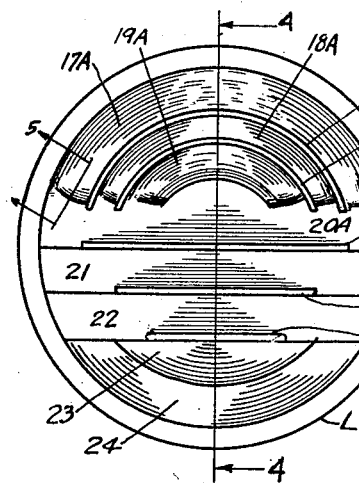
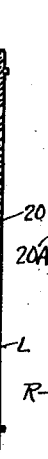
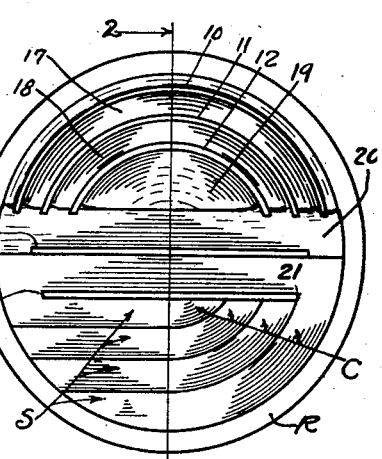
Fig. 3.   Fig. 4.  Fig. 2.   Fig. 1.
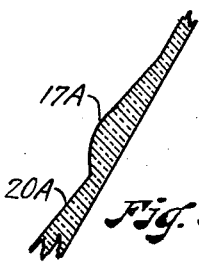
Fig. 5.
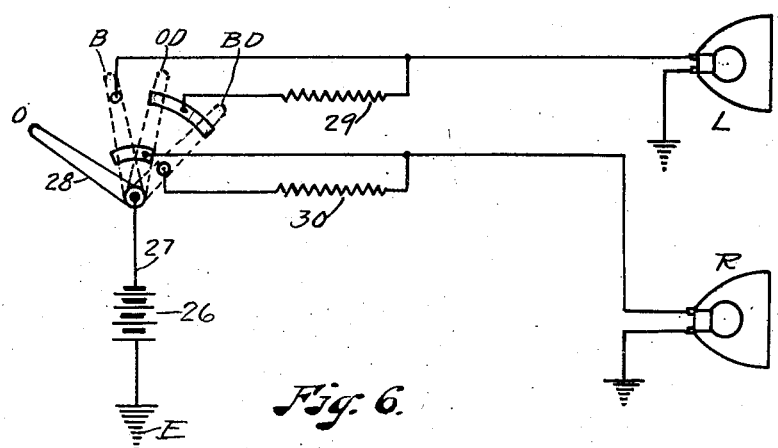
Fig. 6.
Inventor  
Frank. A. Kenney  
By A. J. O'Brien  
Attorney Patented Aug. 17, 1926.

1,596,190

UNITED STATES PATENT OFFICE.

FRANK A. KENNEY, OF DENVER, COLORADO.

SYSTEM OF AUTOMOBILE LIGHTING AND LENSES THEREFOR.

Application filed September 2, 1924. Serial No. 735,318.

This invention relates to a system of automobile lighting and lenses therefor.

In my co-pending application, Serial No. 687,217, filed January 19, 1924, I have shown and described a combination comprising two peculiarly constructed lenses which coact in a particular manner to produce a desirable lighting effect. I have found, however, that in order to secure an even better distribution of light than is possible with the arrangement shown and described in the above-identified application, it is necessary to modify the lens construction to a certain extent.

It is the object of this invention to produce a pair of lenses that shall be so constructed that they cooperate and supplement each other in such a manner that with both lamps bright, a substantially uniform distribution of light is obtained over a long stretch of road directly ahead of the automobile. When driving in the city or on well traveled highways, where there is a substantially constant traffic in both directions, one lamp can be dimmed and the other left bright. The lenses are so related that one of them casts the light downwardly at a more abrupt angle than the other. This lamp lights the road directly ahead of the automobile. The other lens is so made that the downward inclination of the rays is less. This lamp therefore throws the light farther ahead of the machine. When both of the lamps burn brightly, the road is quite uniformly illuminated for a long distance to the front, but when the lamp in the headlight that throws the rays farthest ahead is dimmed, the other headlight illuminates the road directly in front of the machine. In both lamps the rays of light are directed downwardly to such an extent that they do not interfere with the vision of an approaching driver. The lens for one headlight is also provided with arcuate prisms that bend some of the rays outwardly and downwardly and these rays serve to illuminate the side of the road. When the lenses are used on cars in this country, where the practice is to follow the right side of the road, the righthand lens is the one that bends the rays downwardly at the greatest angle so that the lamp that is nearest to the center of the road can be dimmed without impairing the illumination directly in front of the machine.

The arrangement of lamps described is important and the two headlights constructed in the manner indicated cooperate to give fairly uniform distribution of light ahead of the car, one of them illuminating the road for a certain distance and the other illuminating it from where the illumination of the first lamp ceases to a point still farther on. When the lamp last described is dimmed, the remaining lamp gives good driving light, while the dimmed lamp emits only sufficient light to indicate its presence and serves the approaching driver as a means for locating the exact position of the machine.

The above effect is obtained by means of two lenses of slightly different construction, one attached to each headlight. Each of these lenses have arcuate and horizontal ribs projecting rearwardly from the rear surface thereof in combination with horizontal and arcuate prisms, which deflect the light to any desired angle.

My invention can be most clearly described and will be most readily understood when reference is had to the accompanying drawing in which the same is illustrated, and in which:

Fig. 1 is a view looking towards the rear surface of the lens employed in connection with the headlight on the righthand side of the automobile;

Fig. 2 is a section taken on line 2—2, Fig. 1;

Fig. 3 is a view looking towards the rear surface of the lens employed in connection with the headlight on the lefthand side of the automobile;

Fig. 4 is a section taken on line 4—4, Fig. 3;

Fig. 5 is a section taken on line 5—5, Fig. 3; and

Fig. 6 is a diagram of the wiring.

The lens illustrated in Figs. 1 and 2 is the one that is preferably employed in connection with the righthand headlight and is designated by the letter R, while the one shown in Figs. 3 and 4 is employed in connection with the lefthand headlight and is marked L. The surfaces shown are the rear surface of the lenses, which face the lights. The righthand lens has a plurality of arcuate ribs designated by numerals 10, 11 and 12, below which I provide straight horizontal ribs 13 and 14. The lefthand lens has corresponding ribs which have been designated by the characters 11$^A$, 12$^A$, 13$^A$ and 14^A. It will be noticed that the lefthand lens has one less arcuate rib and one more straight rib that the righthand lens, the latter rib being indicated by the numeral 15. The ribs designated 10, 11, 12 and 11^A and 12^A have their upper surfaces (designated by numeral 16) treated so as to reflect the light that strikes them from below. This reflecting surface may be prepared by any suitable process. The horizontal ribs may have one surface silvered or made reflective, if desired, although this is not entirely essential. Referring now to Figs. 2 and 4, it will be noticed that the glass between ribs 10 and 11 and between ribs 11 and 12, is prismatic. That is, the glass is thicker near the lower rib and becomes thinner in an upward direction. These two arcuate prisms are designated by numerals 17 and 18 in Fig. 2 and by 17^A and 18^A in Fig. 3. The surface marked 19 in Fig. 1 is prismatic and has its lower edge straight, while the corresponding surface 19^A in Fig. 3 has an arcuate lower edge.

The straight horizontal ribs 13 and 13^A are located on a diameter and have their upper sides separated from the arcuate ribs and prisms by prisms 20 and 20^A, respectively. Prismatic surfaces 21 separate the ribs 13 and 14. In Fig. 3 a prismatic surface 22 extends horizontally between ribs 14^A and 15. The prismatic surface on lens L has a smaller angle than the corresponding prismatic surfaces on lens R, with the result that they do not bend the light rays so much and will therefore permit the light to travel farther before it strikes the ground. The lenses now begin to differ to an appreciable extent. In lens R there are four prismatic surfaces below rib 14. These are curved from the line of rib 14 to the vertical diameter and are then horizontal and parallel. The light that strikes the curved portions C is bent outwardly and downwardly, while the light that strikes the straight portions S is bent downwardly. As this lens is employed in connection with the righthand headlight, it is apparent that some of the light from this lamp will be thrown onto the roadway to the right of the machine, while the light that strikes the parts S will be deflected downwardly.

The lefthand lens has two arcuate prisms 23 and 24, which deflect rays downwardly and to each side so as to cause a diffusing of the light. Since the prisms of the righthand lens have greater angles than those on the lefthand lens, the light from the right headlight will strike the roadway before that which passes through the lefthand lens, and this produces a fairly even distribution of light for a long distance ahead of the machine when both lamps are bright. When the lefthand lamp is dimmed, however, the light will strike the road a short distance ahead and will emerge from the lamp at such an angle that they cannot interfere with the vision of an approaching driver.

In Fig. 6 I have shown a wiring diagram, which represents a simple and practicable method of wiring the lamps. 26 represents the battery which is grounded at E. A conductor 27 extends to the switch arm 28. This arm is adapted to be moved into the position O, B, OD and BD. When it is in the position O, the circuit is open and both lamps are out. When it is moved to B, both lamps are bright. When in the position OD the current to lamp L must pass through the resistance 29 and lamp L becomes dim. In the position BD, the current to lamp R must pass through the resistance 30 and both lamps are dim.

Having now described my invention, what I claim as new is:

1. A lens for automobile headlights comprising a body portion of substantially flat transparent glass, the rear surface of said lens having spaced arcuate ribs located above the horizontal diameter only, horizontal ribs located below the arcuate ribs, the surfaces between each of said ribs and between the arcuate and the horizontal ribs being prismatic, and curved prisms located below the horizontal ribs.

2. A lens for use in automobile headlights comprising a circular, substantially flat piece of transparent glass having ribs projecting perdendicularly from the rear surface thereof, some of said ribs being arcuate and concentric with the lens, and some of said ribs being straight and perpendicular to a diameter bisecting the arcuate ribs, the portions of the glass between the ribs and between the lower arcuate and the upper horizontal rib being prismatic.

In testimony whereof I affix my signature.

FRANK A. KENNEY.